US006891914B1

United States Patent
Sakashita et al.

(10) Patent No.: US 6,891,914 B1
(45) Date of Patent: May 10, 2005

(54) ABSORBING ROD, AN APPARATUS FOR INSERTING THE ABSORBING ROD, A CASK, AND A METHOD OF STORING SPENT FUEL ASSEMBLIES

(75) Inventors: Kiichiro Sakashita, Hyogo (JP); Tomohiro Itoh, Hyogo (JP); Katsunari Ohsono, Hyogo (JP); Suguru Hode, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 350 days.

(21) Appl. No.: 09/696,947

(22) Filed: Oct. 27, 2000

(30) Foreign Application Priority Data

Nov. 1, 1999 (JP) .......................................... 11-311713

(51) Int. Cl.[7] .............................. G21C 19/40; G21F 5/08
(52) U.S. Cl. ....................... 376/419; 376/418; 376/272; 376/417; 376/902
(58) Field of Search ................................ 376/272, 902, 376/418, 417, 419

(56) References Cited

U.S. PATENT DOCUMENTS

| | | | | |
|---|---|---|---|---|
| 4,605,440 A | * | 8/1986 | Halverson et al. ............ | 75/238 |
| 5,373,540 A | | 12/1994 | DeCooman, Sr. et al. | |
| 5,700,962 A | * | 12/1997 | Carden ......................... | 75/236 |
| 5,965,829 A | * | 10/1999 | Haynes et al. ................ | 75/238 |

FOREIGN PATENT DOCUMENTS

| | | |
|---|---|---|
| EP | 0 372 551 | 6/1990 |
| FR | 2 751 118 | 1/1998 |
| JP | 61-111493 | 5/1986 |
| JP | 62-162997 | 7/1987 |
| JP | 62-242725 | 10/1987 |
| JP | 2-010200 | 1/1990 |
| JP | 4-248499 | 9/1992 |

OTHER PUBLICATIONS

Patent Abstracts of Japan, vol. 003, No. 049 (M–057), April 26, 1979, JP 54–028996, Mar. 3, 1979.
Patent Abstracts of Japan, vol. 1995, No. 04, May 31, 1995, JP 07–020278, Jan. 24, 1995.
Patent Abstracts of Japan, vol. 1999, No. 10, Aug. 31, 1999, JP 11–142582, May 28, 1999.
Patent Abstracts of Japan, vol. 017, No. 090 (P–1492), Feb. 23, 1993, JP 04–289498, Oct. 14, 1992.
Kunio Maruoka, "Spent–Fuel Storage Container by Mitsubishi Heavy Industries, Ltd.", Nuclear Viewpoints, vol. 44/No. 4, Apr. 1998, (4 pages Japanese text, 3 pages English text).

* cited by examiner

*Primary Examiner*—Jack Keith
(74) *Attorney, Agent, or Firm*—Oblon, Spivak, McClelland, Maier & Neustadt, P.C.

(57) ABSTRACT

The absorbing rods have a nearly the same shape as the shape of columnar control rods for PWR used in reactivity control of core in a reactor. The absorbing rods can shield neutrons, and are inserted in control rod guide pipes and measuring pipes in fuel assemblies.

2 Claims, 16 Drawing Sheets

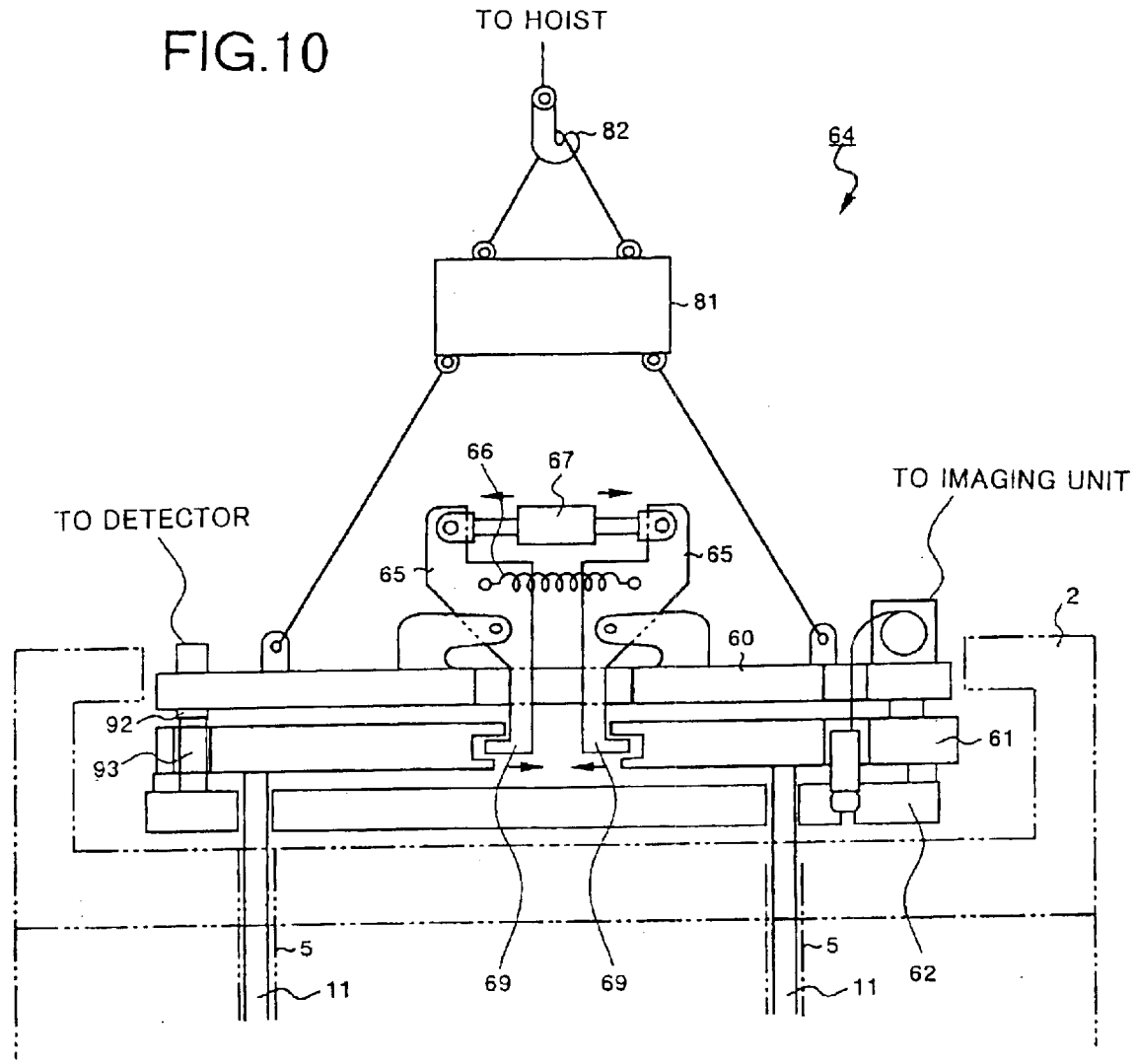

ABSORBING ROD, AN APPARATUS FOR INSERTING THE ABSORBING ROD, A CASK, AND A METHOD OF STORING SPENT FUEL ASSEMBLIES

FIELD OF THE INVENTION

The present invention relates to an absorbing rod having a neutron absorbing capability for being inserted into a control rod guide pipe of spent fuel assemblies, an inserting apparatus for inserting the absorbing rod into the control rod guide pipe, a cask for containing, conveying and storing the spent fuel assemblies, and a conveying and storing method of spent fuel assemblies.

BACKGROUND OF THE INVENTION

Fuel assemblies consumed and no longer usable in a terminal stage of fuel cycle are called spent fuels. Spent fuels contain fission products and other highly radioactive substances, and must be cooled thermally, and hence they are cooled for a specific period in a cooling pit at a nuclear power plant. Then they are transferred into a shielding container called cask, and conveyed and stored at reprocessing plant or storage facility by means of truck or ship. When transferring the spent fuel assemblies into the cask, a holding element having a lattice section called basket is used. Each one of the spent fuel assemblies is put into each of the cells formed as a plurality of storing spaces in the basket, and a proper holding strength to withstand vibration during transportation is assured.

Various types of casks are disclosed in publications such as "Atomic Eye" (Nikkan Kogyo Shuppan Production, Apr. 1, 1998) and Japanese Patent Application Laid-open No. 62-242725.

FIG. 13 is a perspective view of an example of a cask. FIG. 14 is an axial direction sectional view of the cask shown in FIG. 13. A cask 500 is composed of a shell main body 501, a resin 502 which is a neutron shield provided on the outer circumference of the shell main body 501, its outer tube 503, bottom 504 and lid 505. The shell main body 501 and bottom 504 are carbon steel forged parts which are gamma-ray shielding materials. The lid 505 is composed of a primary lid 506 and a secondary lid 507 made of stainless steel or the like. The shell main body 501 and bottom 504 are bonded by butt welding. The primary lid 506 and secondary lid 507 are fixed to the shell main body 501 by means of stainless steel bolts. A metal O-ring is interposed between the lid 505 and shell main body 501, and the inside is kept airtight.

Many inner fins 508 are provided, between the shell main body 501 and outer tube 503, for heat conduction. The inner fins 508 are made of copper in order to enhance the heat conduction efficiency. The resin 502 is injected into the space formed by the inner fins 508 in fluid state, and is solidified by thermosetting reaction or the like. A basket 509 is a bundle structure of 69 square pipes 510 as shown in FIG. 14, and is inserted into a cavity 511 in the shell main body 501.

The square pipes 510 are made of aluminum alloy mixing neutron absorbing material (boron: B) so that the inserted spent fuel assemblies may not reach a critical condition. At both sides of the cask main body 512, moreover, a trunnion 513(only one is shown) for suspending the cask 500. At both ends of the cask main body 512, a buffer materials 514 assembling wood or other shock-absorbing materials are provided (only one side is shown). Reference numeral 515 is a cell for accommodating the spent fuel assemblies.

The light-water type reactor is classified into the boiling water reactor (BWR) and pressurized water reactor (PWR). This cask 500 is the cask for storing the spent fuel assemblies used in BWR. The structure of the fuel assembly for BWR is shown in FIG. 15. The fuel assembly for BWR has four channel boxes 601 arranged in lattice, and a cross-shaped control rod 608 is located in the central area, and the reactivity of fuel rods 603 is controlled by the vertical move of the control rod 608.

The fuel assembly 600 has 8×8 fuel rods 603 arranged in lattice. Each fuel rod 603 is a long bar of about 4 meters in length. A support lattice 607 is provided for supporting the fuel rod 603. In each fuel rod 603, a plurality of columnar pellets 631 formed by sintering powder of uranium oxide are inserted as fuel into a cylindrical clad pipe 633 composed of zirconium alloy, and held by a spring 632 inserted in the upper part of the clad pipe 633. A handle 610 is used for lifting up and down the fuel assembly 600. The spent fuel assembly inserted in the cell 515 in this cask 500 is a fuel assembly for BWR 600 shown in FIG. 15.

By contrast, the fuel assembly shown in FIG. 16 is used in PWR. In this fuel assembly for PWR 700, control rods 708 are properly distributed among fuel rods 703, and the fuel rods 703 and control rods 708 are arranged in a 17×17 lattice form. In this 17×17 fuel assembly 700, one measuring pipe is disposed in the center, and 24 control rods 708 are distributed.

The reactivity of the core can be controlled by moving the control rod 708 up or down. Each fuel rod 703 is a long bar of about 4 meters which is same as the fuel rod 603 for BWR, and hence a support lattice 707 for supporting the fuel rod 703 is provided. In each fuel rod 703, a plurality of pellets 731 are inserted into a cylindrical clad pipe 733 composed of zirconium alloy, and held by a spring 732 inserted in the upper part of the clad pipe 733. In this cask, 70 units of spent fuel assemblies are contained in the cell.

FIG. 17 is an axial direction sectional view of the cask for PWR. As shown in FIG. 17, a cavity 811 of a cask 800 for PWR contains a basket 809 forming a cell 815 of rectangular section by alternately combining plates 817 extending in the radial direction. Each plate 817 is composed of aluminum alloy mixing B as neutron absorbing material, same as the square pipes 510 for BWR.

However, each plate 817 has a through-hole of cooling water passage 816 extending in the axial direction, known as a water zone, and when cooling the spent fuel assemblies, each basket cell and this through-hole are filled with water to moderate neutrons, so that the neutrons may be absorbed efficiently by the plates 817 and the resin 802. The water filling the cooling water passage 816 is discharged after a specified cooling period, and the passage is dried.

This cooling water passage 816 is required because the uranium enrichment factor of fuel assembly for PWR is higher than that of the fuel assembly for BWR, the uranium charging amount per fuel assembly is larger, the sectional area of the fuel assembly is wider, and hence the reactivity is higher in the system arranging these assemblies. The distance dd shown in FIG. 17 is such a distance that it assures the subcriticality of the spent fuel assembly. The distance dd for PWR is required to be longer than the same for BWR. The cells 815 are not arranged in lattice but are deviated in position, which is intended to dispose the spent fuel assemblies for PWR, having a wider sectional area as compared with the spent fuel assemblies for BWR, efficiently in the cavity 811.

In the spent fuel assemblies for PWR mentioned above, the control rods 708 distributed among the fuel rods 703 arranged in lattice are extracted, and the spent fuel assemblies 700 from which the control rods 708 are extracted are inserted and stored in the cells 815 formed by the basket 809 in the cask 800.

Therefore, the vacancies left over by the extracted control rods 708 or measuring rod, not shown, in the spent fuel assemblies are dead spaces, and it is desired to utilize these spaces effectively.

Further, the plates or square pipes for forming the basket for PWR are required to form the cooling water passage 816, and formation of plates or square pipes is more complicated as compared with formation of plates or square pipes for BWR, and it takes much time and labor.

Besides, the sectional area of the spent fuel assemblies for PWR is rectangular and wide, and also the cooling water passage 816 is needed, and hence the accommodation efficiency of the spent fuels in the cask is poor.

SUMMARY OF THE INVENTION

It is an object of the present invention to provide an absorbing rod capable of heightening the accommodation density of spent fuel assemblies, by effectively utilizing the control rod inserting space and measuring rod inserting space existing in the spent fuel assemblies for PWR and shortening the distance dd for assuring the subcriticality among the spent fuel assemblies, its inserting apparatus, cask, and conveying and storing method of spent fuel assemblies.

The absorbing rod according to one aspect of this invention has nearly the same shape as the shape of a columnar control rod for PWR. Further, the absorbing rod has the ability to shield the neutrons. Since the absorbing rod has nearly the same shape as the shape of the columnar control rod for PWR, this absorbing rod can be inserted into the control rod guide pipe of spent fuel assemblies or the control rod guide pipe including the measuring pipe.

The absorbing rod according to another aspect of this invention is made of aluminum composite material or aluminum alloy formed by adding powder of boron or boron compound having a neutron absorbing performance to aluminum or aluminum alloy powder. Since the absorbing rod is made of such material, it is not damaged by minor shocks during transportation. As a consequence, it is possible to maintain the neutron absorbing ability even during transport. For example, it is much safer and therefore preferable to an absorbing rod having a structure in which boron powder is filled inside a pipe.

The cask according to still another aspect of this invention comprises an absorbing rod group having nearly the same shape as the shape of a columnar control rod for PWR. Further, the absorbing rod group has the ability to shield the neutrons. The spent fuel assemblies is stored in the cask. Accordingly, the number of neutrons radiated from the spent fuel assemblies can be decreased. Further, the spacing between the spent fuel assemblies can be shortened.

The inserting apparatus according to still another aspect of this invention comprises a position detection unit which detects the distance between a through-hole group of the guide member and the control rod guide pipe group of the spent fuel assemblies, and their relative positions are adjusted accordingly. Further, the absorbing rod block is lowered so that the through-hole group acts as a guide hole, and the long absorbing rod group can be inserted securely into the control rod guide pipe or the control rod guide pipe including the measuring pipe.

The conveying and storing method of spent fuel assemblies according to still another aspect of this invention comprises the step of inserting an absorbing rod group having nearly the same shape as the shape of a columnar control rod for PWR used in reactivity control of core in a reactor, and having a neutron shielding capability, into a control rod guide pipe group including a measuring pipe of spent fuel assemblies for PWR. Further, the spent fuel assemblies for PWR are conveyed and stored in a state in which the absorbing rod group is inserted. Accordingly, the distance between spent fuel assemblies can be shortened.

Other objects and features of this invention will become apparent from the following description with reference to the accompanying drawings.

BRIEF DESCRIPTION OF THE DRAWINGS

FIG. 10 is a diagram which shows the inserting apparatus right after completion of insertion.

DESCRIPTION OF THE PREFERRED EMBODIMENTS

Preferred embodiments of the absorbing rod, the inserting apparatus (apparatus for inserting the absorbing rod), the cask, and the method of conveying and storing the spent fuel assemblies according to the invention are explained in detail below while referring to the accompanied drawings. However, this invention is not limited only to these embodiments.

Figure 1:
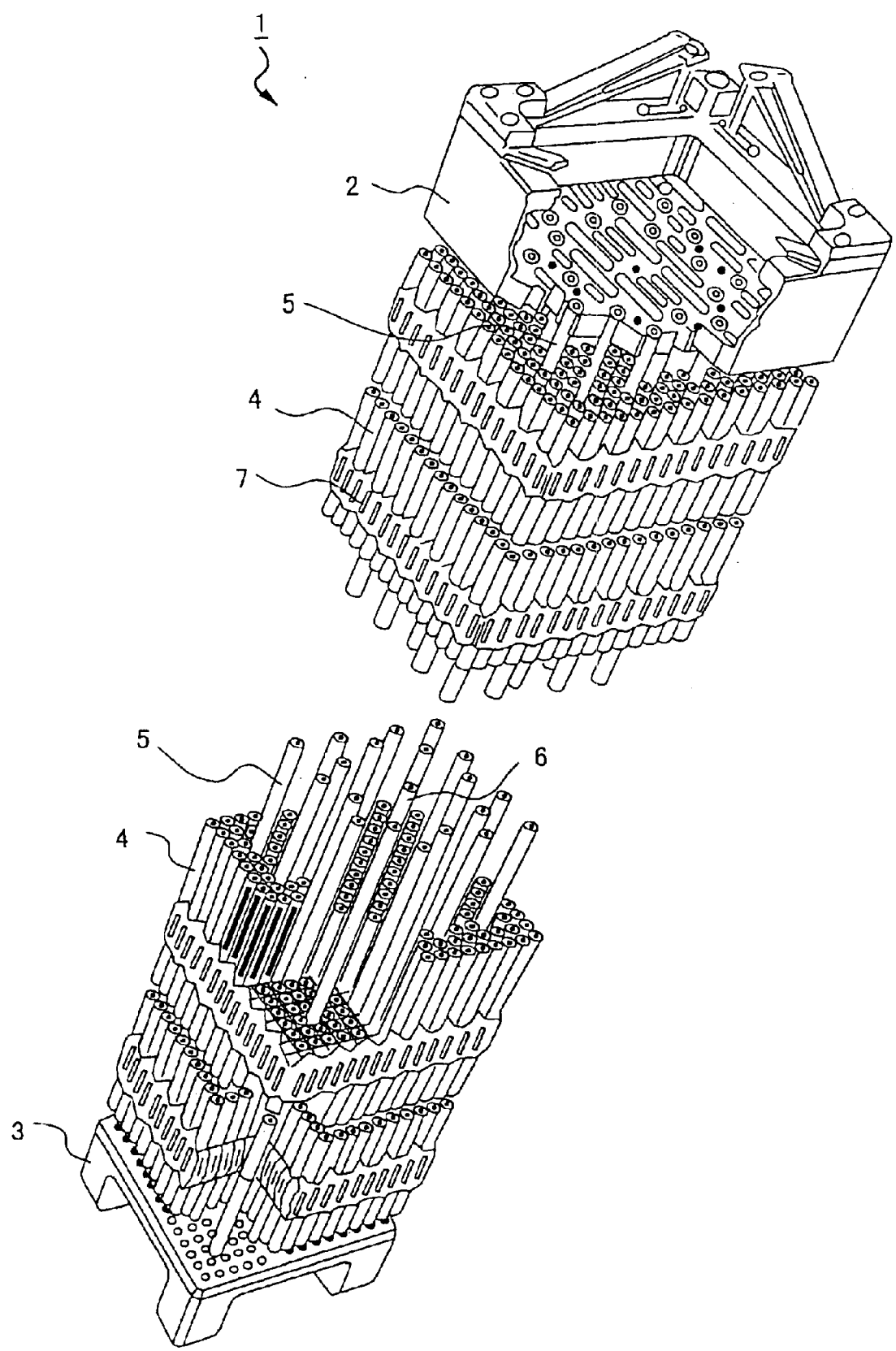
FIG. 1 is a perspective view which shows the structure of a spent fuel assembly for PWR.

A spent fuel assembly conforming to the invention is now explained. FIG. 1 is a perspective view showing a general view of a spent fuel assembly for PWR. As shown in FIG. 1, a fuel assembly 1, which is a spent fuel assembly, is formed as a lattice bundling of fuel rods 4, control rod guide pipes 5, and measuring pipes 6, being arranged in a matrix section of 14×14. This matrix arrangement is supported by support lattices 7 provided at proper positions in the longitudinal direction of the fuel rods 4, control rod guide pipes 5, and measuring pipes 6. The control rod guide pipes 5 and measuring pipes 6 are supported by an upper nozzle 2 and a lower nozzle 3.

That is, the control rod guide pipes 5 and measuring pipes 6 are cylindrical in shape, and held by through-holes between the upper nozzle 2 and lower nozzle 3 provided corresponding to the matrix arrangement positions of the control rod guide pipes 5 and measuring pipes 6. In the control rod guide pipes 5, control rods having a neutron absorbing capability in the reactor are inserted, and the reactivity of the core is controlled by the number and depth of insertion of control rods. The control rod guide pipes 5 are dispersed on the matrix arrangement. In the measuring pipes 6, measuring rods not shown in the drawing are inserted, periodically in the reactor for measuring the temperature and radiation dose, and the information for core management is obtained. However, when stored as spent fuel assembly, the control rods inserted in the control rod guide pipes 5 are extracted, and similarly measuring rods are extracted from the measuring pipes 6.

Figure 2:
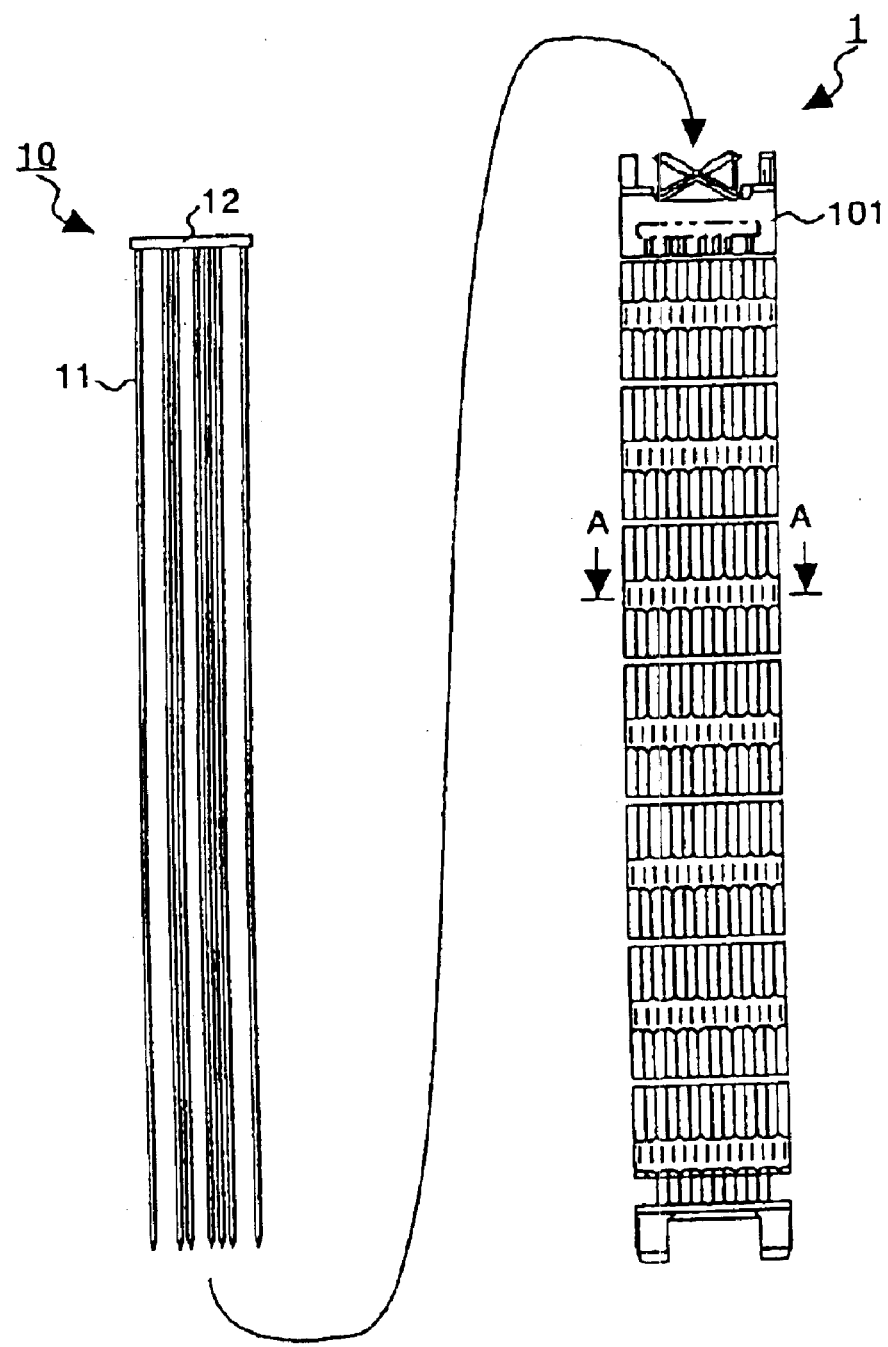
FIG. 2 is a diagram which shows the structure of an absorbing rod block to be inserted in the spent fuel assembly and also explains how the absorbing rod block inserted in the spent fuel assembly.

Accordingly, as shown in FIG. 2, a plurality of absorbing rods 11 having the same columnar shape as the control rods and measuring rods to be inserted in the control rod guide pipes 5 and measuring pipes 6 and having a neutron absorbing capability are newly prepared, and these absorbing rods are inserted into the control rod guide pipes 5 and measuring pipes 6 of the fuel assembly 1. One end of each absorbing rod 11 is bonded to an end plate 12 which is a rectangular plate member to be inserted inside from the upper opening of the upper nozzle 2, and the other end is formed with a taper, so as to be inserted easily into the control rod guide pipes 5 and measuring pipes 6.

The length of the absorbing rod 11 is long enough to envelop the effective length of the fuel. The radius of the absorbing rod 11 is less then the inside diameter of the control rod guide pipe 5 and measuring pipe 6, and is preferably closer to the inside diameter of the control rod guide pipe 5 and measuring pipe 6 as far as possible, but a certain clearance is required considering the length of about 4 meters.

Figure 3:
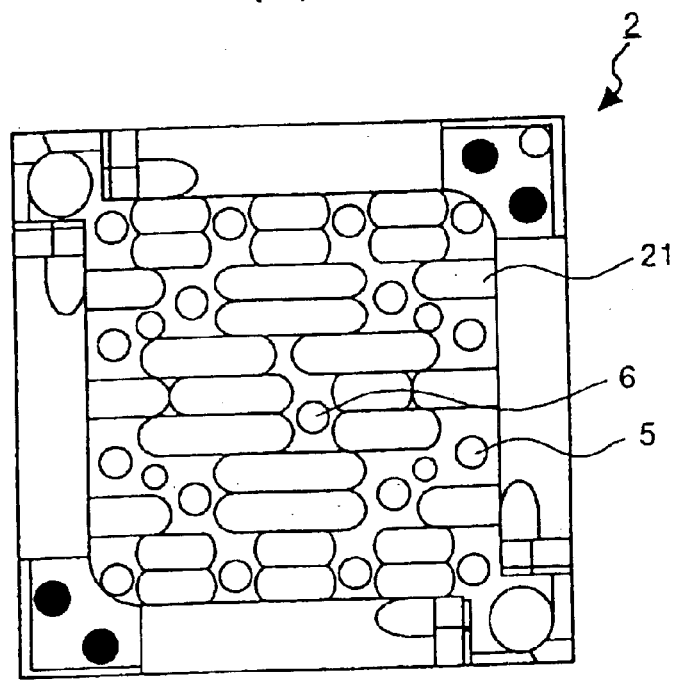
FIG. 3 is a plan view of the spent fuel assembly.

FIG. 3 is a plan of the fuel assembly 1 shown in FIG. 2. The upper nozzle 2 shown in FIG. 3 corresponds to the matrix arrangement, in which the control rod guide pipes 5 and measuring pipes 6 are disposed. There are a plurality of through-holes for light water passages 21 in the reactor. The absorbing rod 11 is penetrating through the control rod guide pipe 5 and measuring pipe 6.

Figure 4:
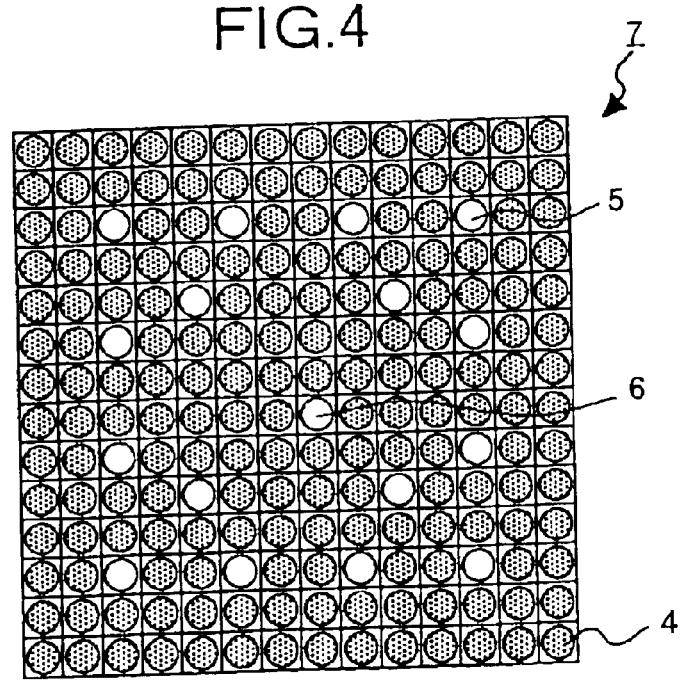
FIG. 4 is a sectional view taken along line A—A of support lattice.

FIG. 4 is a sectional view taken along line A—A of support lattice 7 of the fuel assembly 1 shown in FIG. 2. The support lattice 7 supports the lattice state of 14×14 consisting of fuel rods 4, control rod guide pipes 5 and measuring pipes 6. The absorbing rods 11 penetrate through the control rod guide pipes 5 and measuring pipes 6 of the support lattice 7 shown in FIG. 4.

Therefore, the end plate 12 shown in FIG. 2 is bonded with the absorbing rod 11 so that the absorbing rod 11 may be held in the state inserted in the control rod guide pipe 5 and measuring pipe 6. By using an absorbing rod block 10 formed by bonding a plurality of absorbing rods 11 and end plates 12, a plurality of absorbing rods 11 can be inserted in a batch into the control rod guide pipes 5 and measuring pipes 6. Alternatively, instead of bonding the absorbing rods 11 by using end plates 12, the absorbing rods 11 may be individually inserted into the control rod guide pipes 5 and measuring pipes 6. However, when conveying the fuel assembly 1 in which the absorbing rods 11 are inserted, it is easier to hold the absorbing rods 11 by using the absorbing rod block 10.

Figure 5:
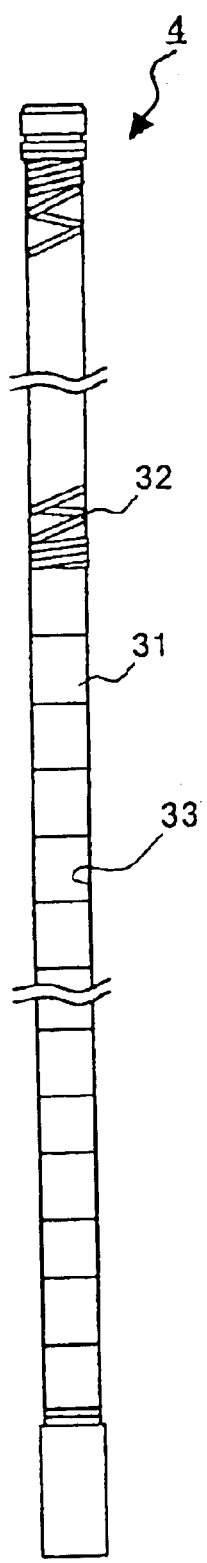
FIG. 5 is a diagram showing the structure of a fuel rod.

FIG. 5 is a front view of the fuel rod 4. In FIG. 5, a plurality of pellets 31 are inserted into a cylindrical clad pipe 33 composed of zirconium alloy, and the pellets 31 are held by a spring 32 inserted in the upper part of the clad pipe 33. This fuel pipe 4 is mainly composed of the spent fuel assembly as mentioned above.

The absorbing rod 11 is composed of aluminum composite material or aluminum alloy formed by adding a powder of boron or of a boron compound having a neutron absorbing capability, to a powder of aluminum or of an aluminum alloy, and is designed not to reach the stage of criticality from the inside of the spent fuel assembly.

The following material may preferably used as the aluminum composite material. In addition to adding the powder of boron or boron compound to the aluminum composite material, third particles of oxides may be added. Accordingly, mechanical alloying is performed and the strength of the material can be increased. To achieve this, powder of aluminum or aluminum alloy as the matrix material, boron or boron compound as the neutron absorber, and third particles as oxides, nitrates, carbides, borides are mixed in the Attriter pan.

The amount of these third particles should preferably be greater than 0.1 weight percent and less than 30 weight percent. Such an amount is preferable because, if the amount is less than 0.1 weight percent, then there is not much effect on strengthening the material. On the other hand, if the amount is greater than 30 weight percent, then the property of the material to expand decreases. Further, it is preferable that the diameters of the third particles in the aluminum matrix is greater than 0.01 $\mu$m and less than 10 $\mu$m. The material having a diameter smaller than 0.01 $\mu$m is very costly and difficult to acquire. On the other hand, the material having a diameter greater than 10 $\mu$m does not contribute much to strengthening the material.

The amount of boron or boron compound should preferably be greater than 1 weight percent and less than 20 weight percent. Such an amount is preferable because, if the amount is less than 1 weight percent, then it does not absorb the neutrons properly. On the other hand, if the amount is greater than 20 weight percent, then the property of the material to expand decreases. Further, it is preferable that the diameters of the boron or boron compound is greater than 0.01 $\mu$m and less than 100 $\mu$m. The material having a diameter smaller than 0.01 $\mu$m is very costly. On the other hand, the material having a diameter greater than 100 $\mu$m degrades the strength.

Further, any material having a property to absorb the neutrons may be used instead of boron or boron compound. That is, Cd, Hf, or rare earth elements having a bigger neutron absorbing cross section may be used. For example, boron or boron compound are used in case of BWR, however, Ag—In—Cd compound are used in case of PWR. In the Ag—In—Cd compound, it is general that In is 15 weight present and Cd is 5 weight present. Further, carbides such as Eu, Sm, Gd may be used.

$Al_2O_3$, $ZrO_2$, $SiO_2$, MgO, $TiO_2$, $Cr_2O_3$ may be used as the oxides in the third particles. $Si_3N_4$, BN are the examples of nitrates that may be used. SiC, WC, $Cr_2C_3$ are the examples of carbides, and $ZrBr2$ is the example of boride that may be used. Further, it is not necessary to use only the third particles mentioned here. Any material may be used according to the need.

The following material may be used as powder of aluminum or aluminum alloy. That is, pure aluminum (JIS 1xxx), Al—Cu aluminum compound (JIS 2xxx), Al—Mg aluminum compound (JIS 5xxx), Al—Mg—Si aluminum compound (JIS 6xxx), Al—Zn—Mg aluminum compound (JIS 7xxx), Al—Fe aluminum compound (Fe content between 1 to 10 weight percent). Further, Al—Mn aluminum compound (JIS 3xxx) also may be used. The material to be used may be selected depending upon the required strength, expansion, processing ability, and temperature resistance.

A powder obtained by the rapid solidification has uniform and fine composition. Such a powder may be used in as powder of aluminum or aluminum alloy. Known methods such as unit roll method, double roll method, atomization methods such as air atomization or gas atomization may be used to obtain rapid solidification powders. It is preferable that the particles of the obtained powder of aluminum or aluminum alloy has a diameter of between 5 to 150 $\mu$m.

If the diameter is less than 5 $\mu$m, then the particles come together and form a mass. Further, if the diameter is less than 5 $\mu$m then it is difficult to use the atomization methods (it is required to separate the minute powder and the coast increases). On the other hand, if the diameter is greater than 150 $\mu$m, then again there is a limitation on the use of the atomization method, and it becomes difficult to mix the material with the minute addition particles. The most preferable diameter is 50 to 120 $\mu$m. The cooling speed should be above 102 degree centigrade per second. Most preferably, the cooling speed should be above 103 degree centigrade per second.

On the other hand, boron or boron compound has a property that it has great capability to absorb fast neutrons. $B_4C$, $B_2O_3$ may be applied in the present invention. Out of these two, $B_4C$ has more boron content per unit weight. Therefore, $B_4C$ can absorb more neutrons with lesser quantity. Further, $B_4C$ has more hardness, and therefore, preferable.

It is mentioned above that, the third particles are oxides, nitrates, carbides, borides. However, the particles other than these may be added. For, example, Zr or Ti may be added so as to increase the strength.

The material mixed in the above-mentioned manner and amount is subjected to mechanical alloying in an Attriter mill. A rotating mill or a vibrating mill may be used instead of Attriter mill. When subjected to mechanical alloying, aluminum and aluminum compound is crushed by the balls and become flat. Further, boron or boron compound and the third particles ground to still finer size and they uniformly enter into the voids in the aluminum matrix. These flattened particles become particles of normal shape containing aluminum or aluminum compound and the third particles.

It is possible to increase the material strength greatly because of the additio of the third particles and subjecting the material to mechanical alloying. It was confirmed with an experiment that the material formed in this manner has about three times higher material strength than the material formed using the ordinary mixers (for example, crossrotary mixer or V mixer). Further, boron or born compound having high hardness get dispersed finely and uniformly inside the matrix so that the cohesion of boron can be prevented. Further, the squeeze out property thereof can be incread greatly. Accordingly, dice for squeeze out is not so worn-out due to friction.

Further, when adding the third particles, the aluminum or aluminum composite powder may be subjected to oxidation thereby creating a oxide layer on the surface of these particles, finely pulverizing this oxide layer due to the mechanical alloying so as to cause the particles to disperse in the matrix. The oxidation of the aluminum or aluminum composite powder may be performed by heating in air. For example, aluminum or aluminum composite powder may be put into a furnace and agitated while being heated. When this process is carried out for a few hours, an oxide layer is formed on the surface of the aluminum or aluminum compound.

Thus, the absorbing rods 11 is formed of aluminum composite material or aluminum alloy. Accordingly, it is light in weight, has the ability to shield the neutrons, and the distance between the spent fuel assemblies can be decreased. In other words, if the same number of spent fuel assemblies are to be used, then the cask becomes more light-weight. Any material that has the property to absorb the neutrons may be used instead of aluminum composite material or aluminum alloy. Accordingly, the fuel rod 4 may itself be used instead of the absorbing rod 11.

According to the first embodiment, since the absorbing rods 11 having a neutron absorbing capability are inserted into the control rod guide pipes 5 and measuring pipes 6 of spent fuel assemblies, the neutrons can be absorbed by effectively utilizing the space in the control rod guide pipes 5 and measuring pipes 6, and emission of neutrons from the inside of the spent fuel assemblies can be reduced, and therefore the spacing distance for subcriticality between spent fuel assemblies can be shortened. Alternatively, by using the absorbing rod block 10 bonding a plurality of absorbing rods 11 by end plates 12, the absorbing rods 11 can be inserted in a batch form into the control rod guide pipes 5 and measuring pipes 6, so that the working efficiency is enhanced.

A second embodiment is explained below. The second embodiment relates to a cask for accommodating the spent fuel assemblies in which absorbing rods 11 of the first embodiment are inserted, which eliminates the cooling water passage provided in the plates of the basket in this cask.

Figure 6:
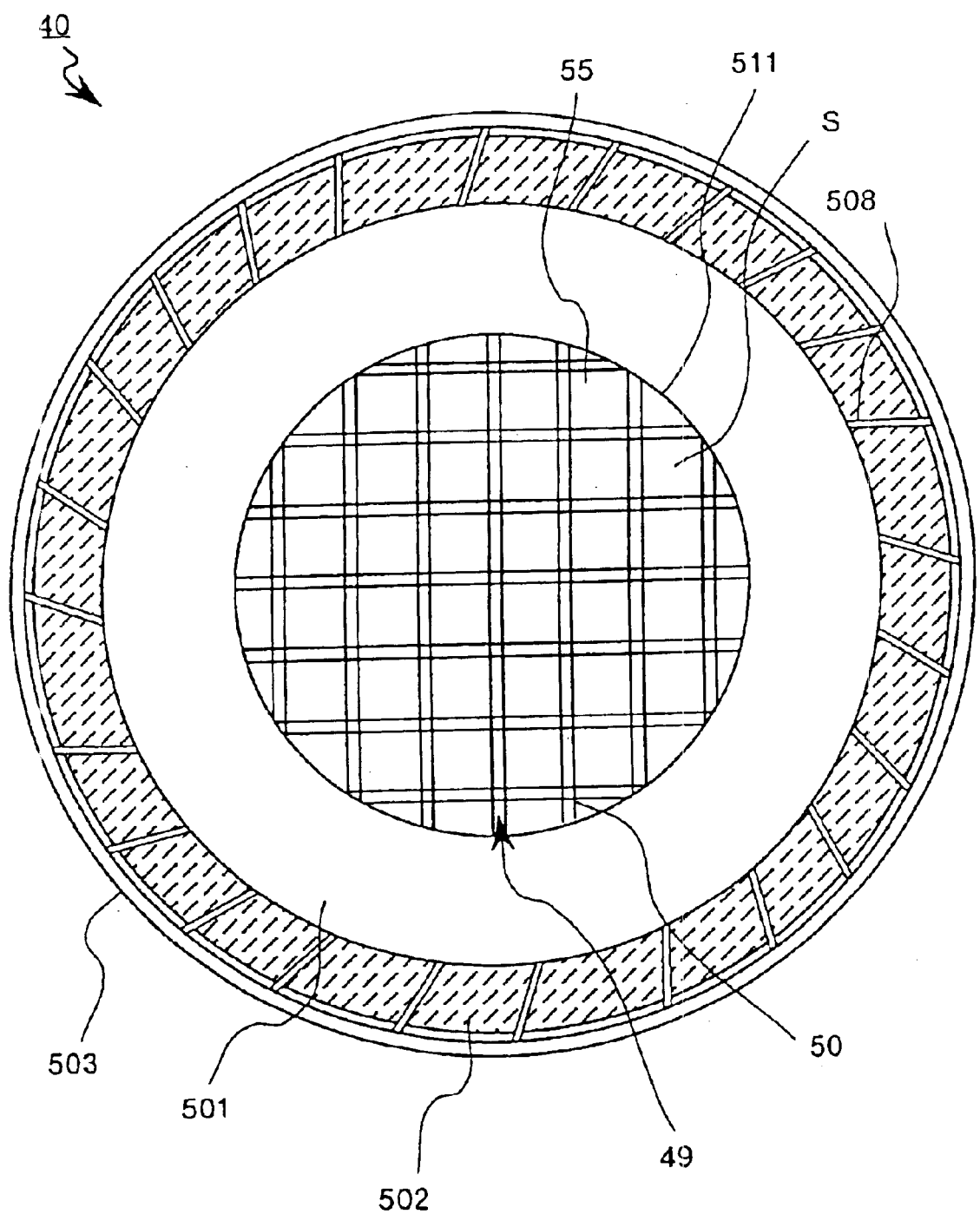
FIG. 6 is a radial direction sectional view which shows the structure of a cask according to the present invention.
Figure 17:
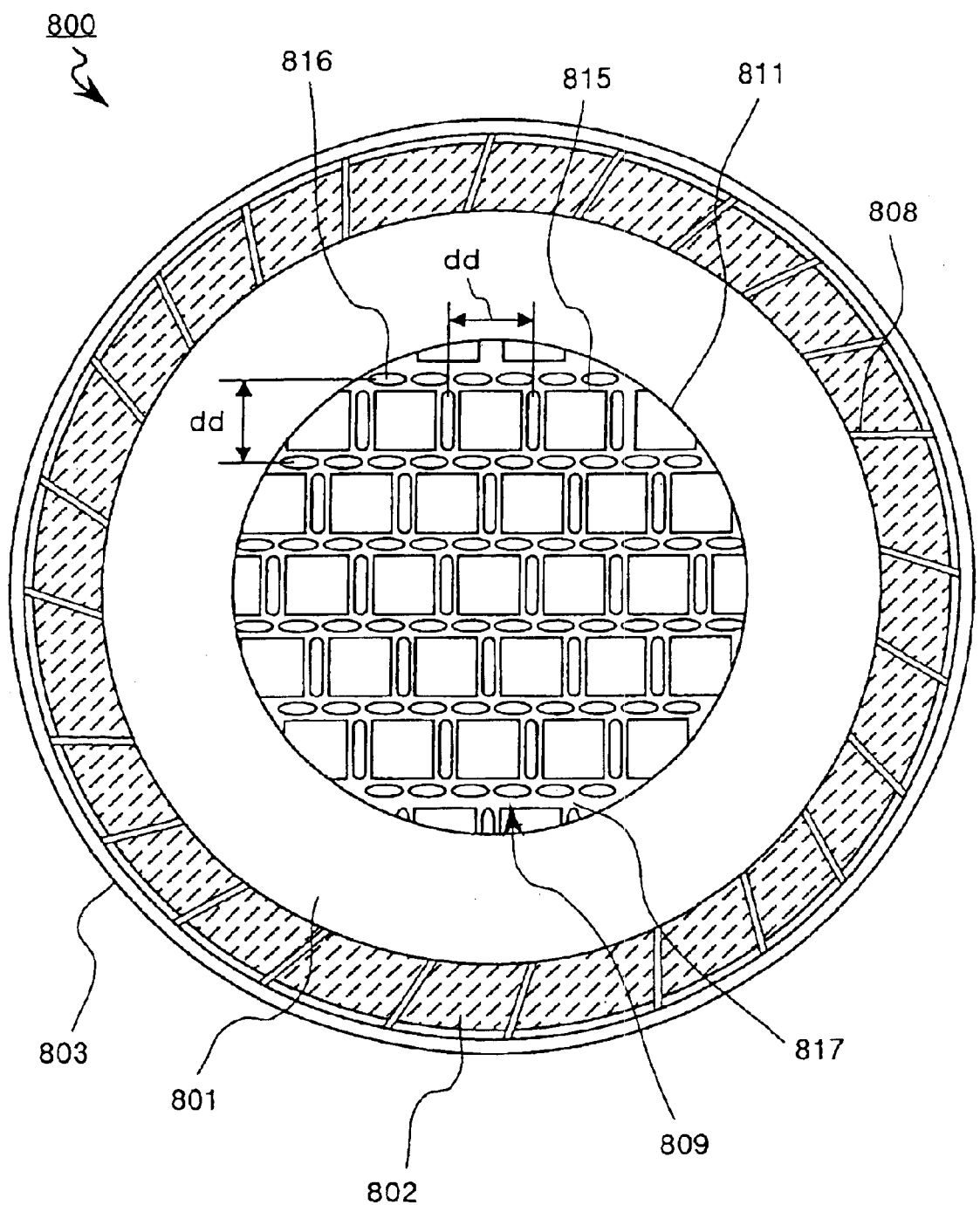
FIG. 17 is a radial direction sectional view which shows structure of a conventional cask for PWR.

FIG. 6 is a radial direction sectional view of the cask, which is an improvement of the conventional cask for PWR shown in FIG. 17. The plate 817 shown in FIG. 17 is high in the uranium enrichment factor in the spent fuel assemblies for PWR, is large in uranium charge amount per unit fuel assembly as compared with the fuel for BWR, and is wide in the sectional area of fuel assembly, and hence the reactivity is high in the system arranging them. Therefore, in order to absorb the neutrons efficiently by moderating the neutrons in cooling process, the cooling water passage 816 is filed with water as a neutron moderator. The spent fuel assemblies in which the absorbing rods 11 explained in the first embodiment are inserted contain neutron absorbing materials in the spent fuel assemblies, and hence the neutrons released outside from the spent fuel assemblies are decreased.

As a result, it is possible to shorten the spacing distance for controlling with the subcriticality in cooling of spent fuel assemblies, and hence it does not require cooling water passage 816 in cooling process. Accordingly, the plates 50 for composing the basket 49 of the cask 40 for PWR shown in FIG. 6 do not have a cooling water passage the same as in the basket structure for BWR.

Hence, in the cask 40 for PWR shown in FIG. 6, although the capacity volume is same as in the cavity 811 of the cask 800 for PWR shown in FIG. 17, the thickness of the plates 50 can be reduced, so that more spent fuel assemblies can be accommodated. For example, in the cask 800 shown in FIG. 17, 19 spent fuel assemblies can be accommodated, whereas in the cask 40 shown in FIG. 6, 32 spent fuel assemblies can be accommodated. By using the cask 40 in the second embodiment, 13 more spent fuel assemblies can be accommodated. In other words, the degree of integration of spent fuel assemblies can be heightened.

In the basket of the same shape as shown in FIG. 17, when the spent fuel assemblies in the first embodiment are accommodated, the emission of neutrons is decreased, and hence the resin thickness can be reduced. As a result, it is possible to reduce the entire size of the cask when accommodating the same number of spent fuel assemblies.

In the second embodiment, the cell 55 is composed by combining the plates 50 in lattice form. However, the cell may be formed with square pipes.

Further, when accommodating the spent fuel assemblies in the first embodiment, the thickness of the plates for composing the basket of the cask can be reduced correspondingly to the neutron absorbing capability of the absorbing rods inserted in the spent fuel assemblies, so that the number of spent fuel assemblies accommodated in the cask can be increased. Further, it is not necessary to install the cooling water passage, which is the feature of the cask for PWR, in the plates or square pipes, and plates or square pipes of simple structure as in the plates or square pipes for BWR can be sued.

A third embodiment is explained below. In the first embodiment, by using the absorbing rod block 10 composed of a plurality of absorbing rods 11, the plurality of absorbing rods 11 are inserted in batch to enhance the working efficiency. The third embodiment is further intended to insert spent fuel assemblies of plural absorbing rods 11 more easily, safely and securely.

Figure 7:
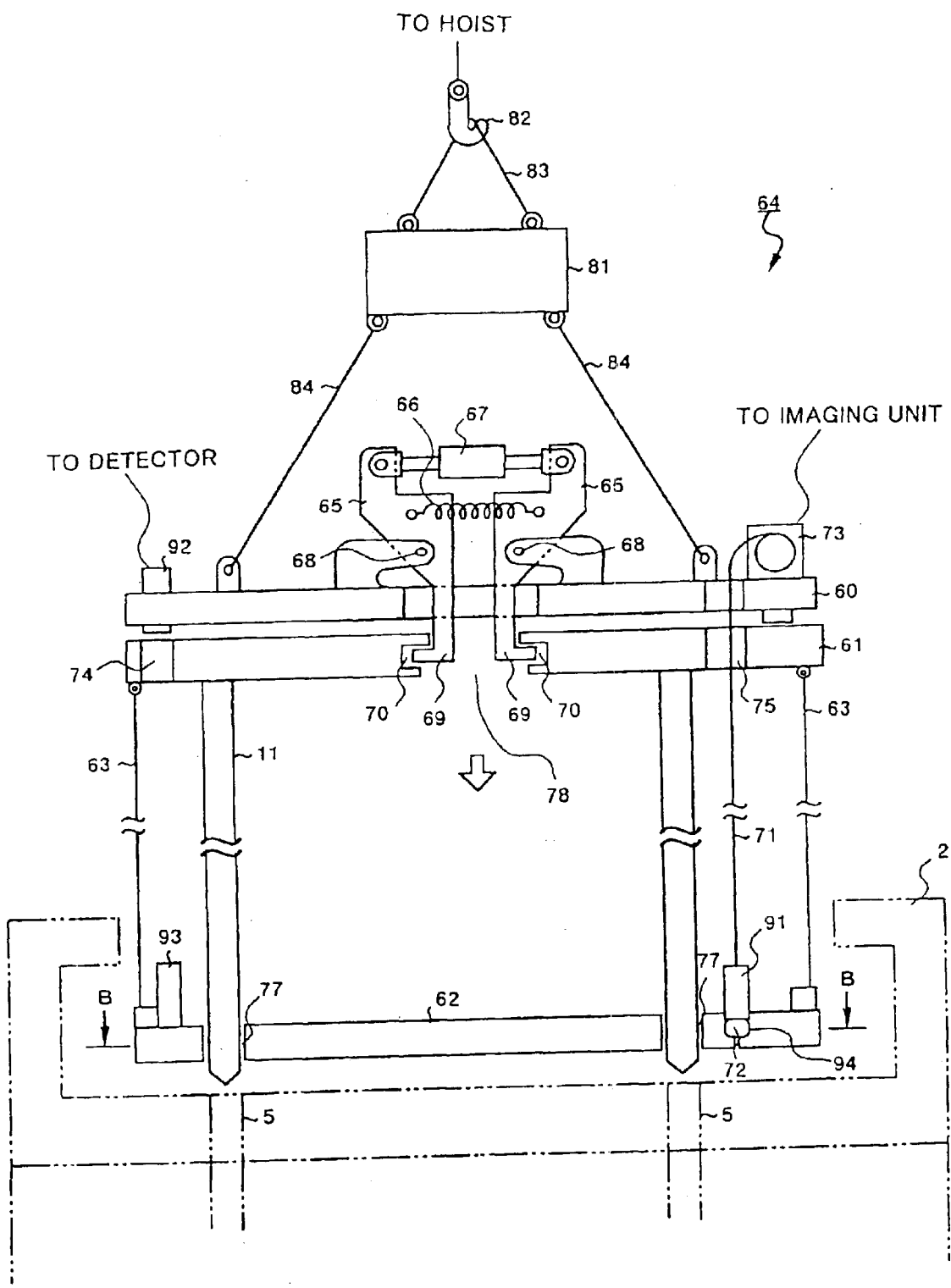
FIG. 7 is a diagram which shows the structure of an inserting apparatus according to the present invention.

FIG. 7 shows the structure of the inserting apparatus according to the third embodiment. This inserting apparatus comprises an upper end plate 61 coupling the absorbing rod 11, a lower end plate 62 for guiding the absorbing rod 11, and a suspender 64 for moving the upper end plate 61.

Figure 8:
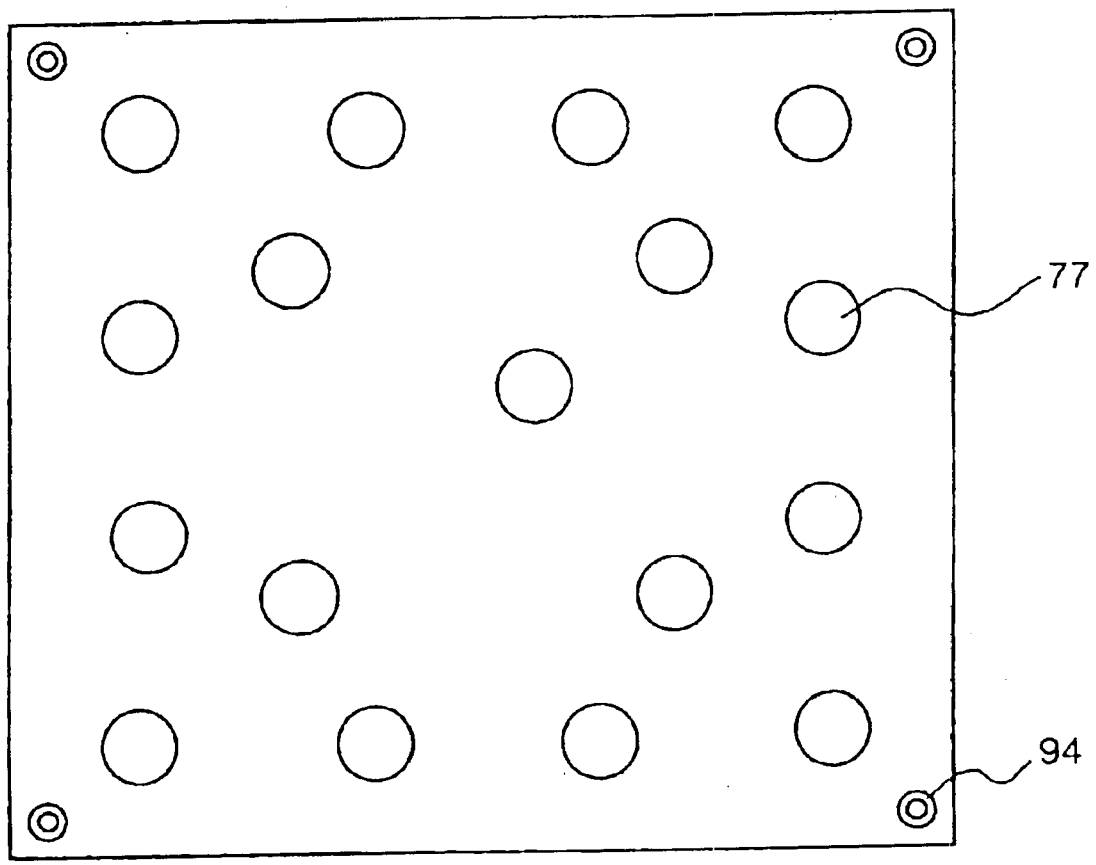
FIG. 8 is a sectional view taken along B—B of lower end plate.

The upper end plate 61 corresponds to the absorbing rod block 10. The upper end plate 61 and lower end plate 62 are suspended by the suspender 63. FIG. 8 is a sectional view taken along line B—B of the lower end plate 62. The lower end plate 62 has a guide hole 77 for guiding the absorbing rod 11. The guide hole 77 is provided corresponding to the position of the control rod guide pipe 5 and measuring pipe 6. When the upper end plate 61 and lower end plate 62 are suspended by the suspender 63, when stopping still or in the initial state, the leading end of the absorbing rod 11 must be at least inserted into the guide hole 77. The width of the upper end plate 61 and lower end plate 62 in the horizontal direction must be wide enough for allowing to be inserted from the upper opening of the upper nozzle 2, and the width is required to be at least enough for forming the guide hole 77 of the control rod guide pipe 5 and measuring pipe 6.

A suspension hole 78 is provided almost in the center of the upper end plate 61. The inner wall of the suspension hole 78 has a dent 70 for hooking the claw 69 of the clamping tool 65 mentioned below. The clamping tool 65 rotates freely about the fulcrum 68 provided in a flat suspension plate 60 corresponding to the upper end plate 61, and it is provided in the upper part of the clamping tool 65, and the claw 69 provided in the lower pat of the clamping tool 65 is always opened by a tension spring 66 for pulling the upper pat of the clamping tool 65 mutually, so that the upper end plate 61 is held. When canceling holding of the upper end plate 61, that is, when separating the upper end plate 61 and lower end plate 62 from the suspension portion 64, the upper part of the clamping tool 65 is pushed open by overcoming the tensile force of the tension spring 66, by means of an air cylinder 67 for connecting the upper part of the clamping tool 65 mutually. As a result, the clamp 69 is released from the dent 70, and separated through a suspension hole 78 from each other.

The suspension plate 60 and load cell 81 are suspended through a rope 84, and further the load cell 81 is suspended on a hook 82 through a rope 83 while detecting the suspended load, and this hook 82 is connected to a hoist not shown in the drawing. The hoist moves the entire suspension portion 64, in particular, moves vertically, and can move the upper end plate 61 and lower end plate 62 coupled together through the clamping tool 65 simultaneously.

On the suspension plate 60, an optical fiber 71 is wound through a take-up unit 73 corresponding to the vertical motion of the lower end plate 62. The optical fiber 71 penetrates the through-hole 76 of the upper end plate 61, and extends up to an imaging whole 94 of the lower end plate 62. At the leading end of the optical fiber 71, there is a lens 72 of the optical fiber 71, and the lens 72 is directed downward through the imaging whole 94. A weight 91 is provided at the leading end of the optical fiber 71, and the lens 72 of the optical fiber 71 is pressed, so that the image may be stably taken. The other end of the optical fiber 71 is connected to the imaging unit not shown through the take-up unit 73, and the image near the lens 72 is taken by the camera or the like.

The suspension plate 60 further has a detector 92 having a protrusion in the lower part. On the lower end plate 62 corresponding to this detector 92, a detecting protrusion 93 is formed, and this detecting protrusion 93 may abut against the lower protrusion of the detector 92 by way of the through-hole 74 of the upper end plate 61. When this detecting protrusion 93 and the lower protrusion of the detector 92 abut against each other, the absorbing rod 11 is completely inserted into the control rod guide pipe 5 and measuring pipe 6. This abutting is detected by the detector 92, and the result of detection is issued to a detector not shown in the drawing.

Figure 11:
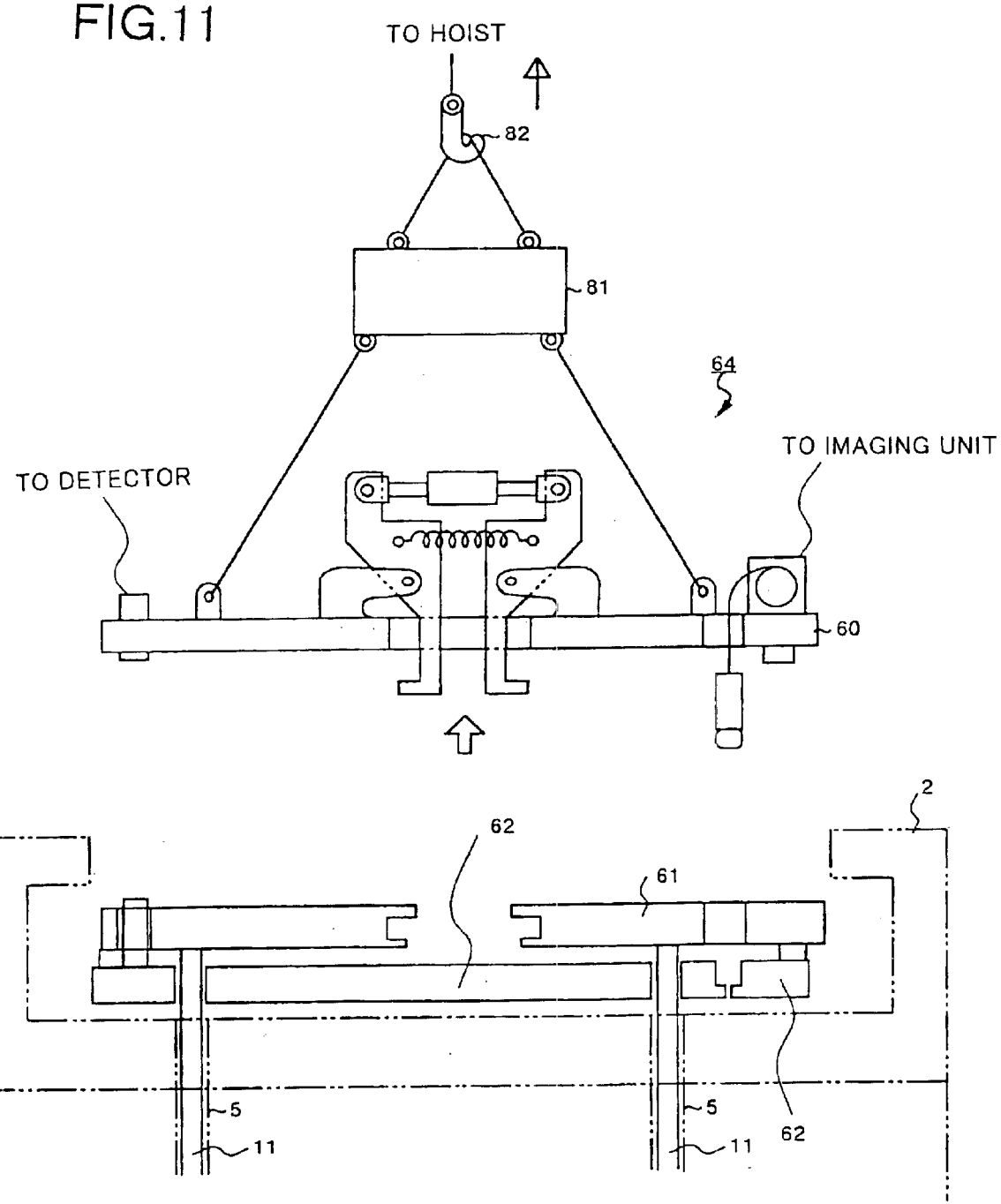
FIG. 11 is a diagram which shows the structure of spent fuel assembly after completion of insertion and a structure of a suspender.

Referring further to FIG. 9 to FIG. 11, the inserting operation of the absorbing rod 11 by the inserting apparatus is explained. The state shown in FIG. 7 is an initial state of insertion, and the upper end plate 61 is coupled to the suspension portion 64, and the suspender 63 is extended to the full extent. In this state, the relative configuration of the position of the lower end plate 62 and the position of the upper nozzle 2 is detected through the lens 72 of the optical fiber 71. This relative configuration is detected by image processing, and it is determined whether the relative position deviation is less than a specified value or not, for example, by pattern matching, and when less than the specified value, it is judged that the lower end plate 62 and upper nozzle 2 are matched in position, that is, the guide hole 77 of the lower end plate 62 and the control rod guide pipe 5 of the upper nozzle 2 are matched in relative configuration.

Figure 9A:
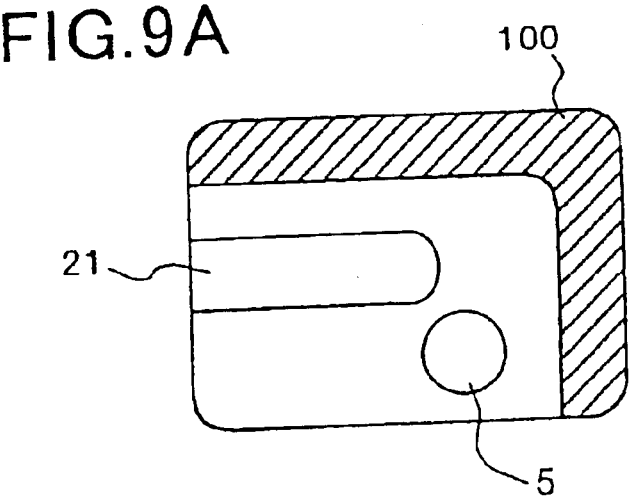
FIG. 9A to FIG. 9C are examples of the photographed images.
Figure 9B:
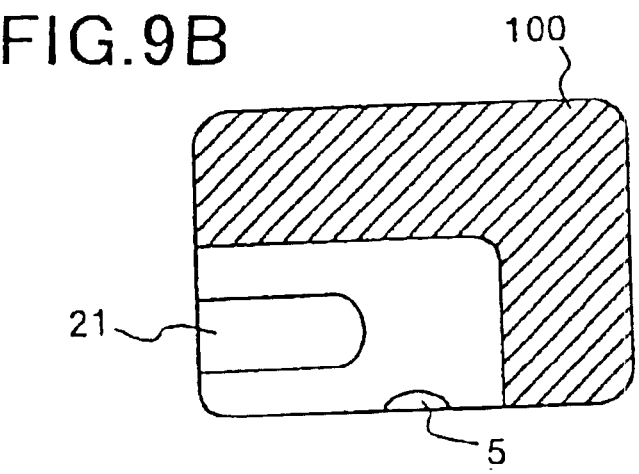
Figure 9C:
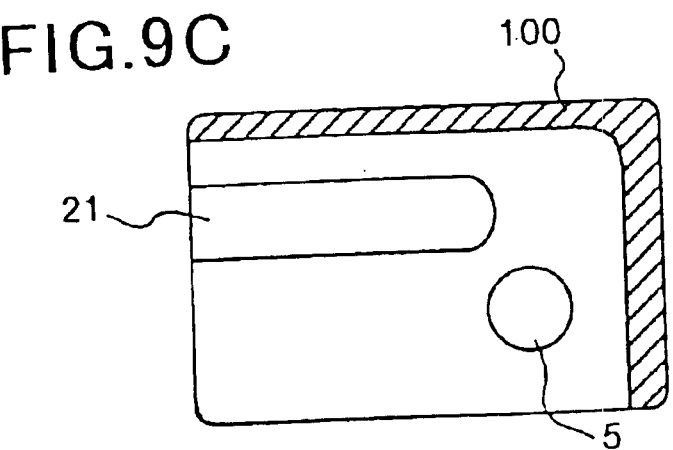

More specifically, as shown in FIG. 9A, a reference image without deviation in relative position is obtained. If the lower end plate 62 is deviated in position to upper right direction in the drawing, as shown in FIG. 9B, the passage 21 and control rod guide pipe 5 are positioned at the lower right corner in the drawing, and the region of a nozzle casing 100 at the upper end of the wall of the upper nozzle 2 is wider. On the other hand, when the lower end plate 62 is deviated to the lower right position in the drawing, as shown in FIG. 9C, the passage 21 and the control rod guide pipe 5 are positioned at the upper right corner in the drawing, so that the region of the nozzle casing 100 is smaller. Therefore, the position deviation of the lower end plate 62, that is, the position deviation of the absorbing rod 11 can be detected by matching the patterns of the image shown in FIG. 9B and FIG. 9C and the reference image shown in FIG. 9A. This position deviation information is transmitted to the operator handling the hoist, and this operator handles so as to eliminate the position deviation by manipulating the hoist on the basis of this information of position deviation.

When correction of position deviation is over, the operator lowers the hoist, and also lowers the upper end plate 61, thereby lowering the absorbing rod 11, so that the absorbing rod 11 is inserted into the control rod guide pipe 5 and measuring pipe 6 through the guide hole 77. In this case, the lower end plate 62 is mounted on the inner upper side of the upper nozzle 2 at a position free from deviation of position.

When insertion of absorbing rod 11 into the control rod guide pipe 5 and others is over, the protrusion of the detector 92 and the detecting protrusion 93 abut against each other, and the result of detection is issued to the detector not shown. On the basis of this result of detection, the operator manipulates to extend the air cylinder 67, and eliminate hooking of the claw 69. Then, the operator lifts the hoist, and separates the upper end plate 61 from the suspension portion 64. Whether separated actually or not can be checked by the load cell 81.

As a result, as shown in FIG. 11, the absorbing rod 11 is inserted into the control rod guide pipe 5 and others, and the upper end plate 61 holding the absorbing rod 11 and the lower end plate 62 guiding the absorbing rod 11 settle within the upper nozzle 2, thereby not exceeding the shape of the upper nozzle 2. Therefore, these spent fuel assemblies are in the same shape as the spent fuel assemblies in which the absorbing rods 11 are not inserted.

Incidentally, the abutting of the detector 92 and detecting protrusion 93 can be detected by magnetic or electric means. Alternatively, using an optical detector 25 as the detector 92, the distance can be measured by optical means, and it may be judged that the insertion is complete when the distance becomes shorter than a specified value.

By forming the upper end plate 61 and lower end plate 62 by a material having a neutron absorbing capability such as B—Al material, same as the absorbing rods 11, it is possible to reduce the thickness of the resin in the lid direction in the case of a wet cask for storing in a state immersed in water.

According to the third embodiment, by detecting the relative position deviation of the absorbing rods and control rod guide pipes 5 and others by using the inserting apparatus, the positions are corrected approximately, and the relative positions of the absorbing rods and control rod guide pipes 5 and others are matched, and further by using the tape shape of the lading end of the absorbing rods, the absorbing rods can be securely and easily inserted into the control rod guide pipes 5. Also by detecting the completion of insertion, safety in insertion can be assured.

A fourth embodiment is explained below. In the second embodiment, it is intended to store the spent fuel assemblies in the first embodiment into the cask. However, the fourth embodiment specifies the method of storing spent fuel assemblies in the storage pool.

Figure 12:
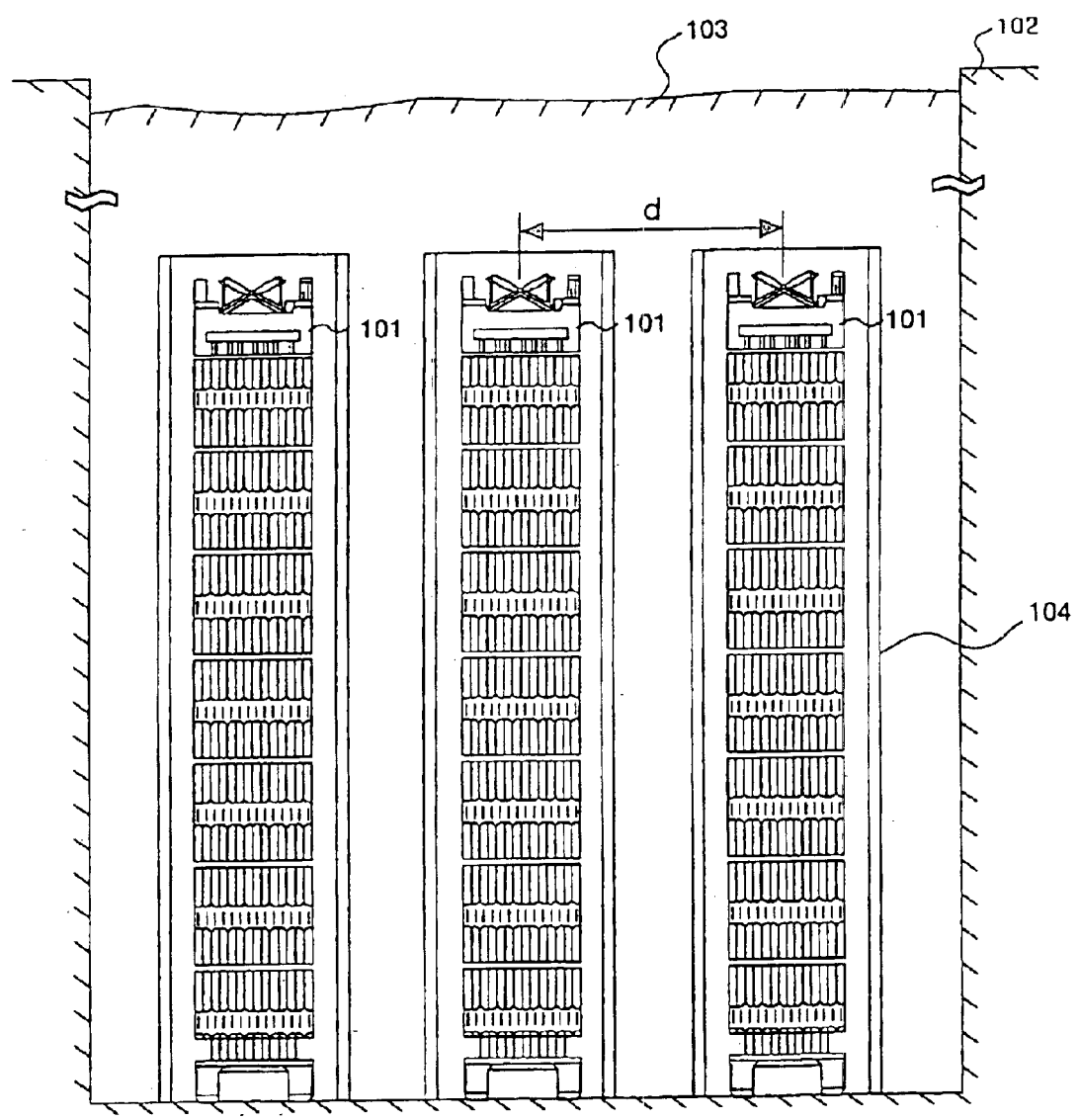
FIG. 12 is a schematic diagram which shows storage configuration of spent fuel assemblies in a storage pool.
Figure 13:
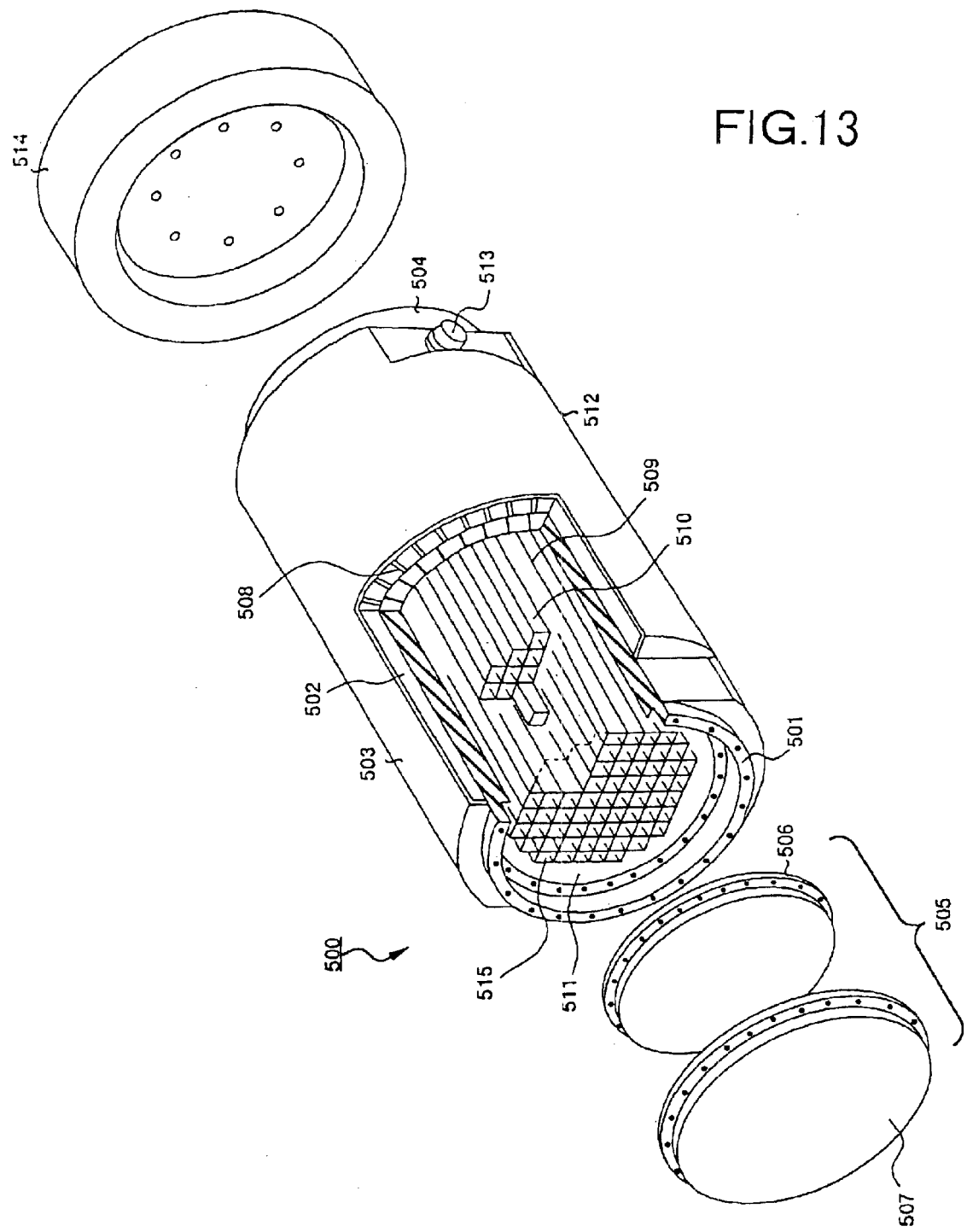
FIG. 13 is a perspective view showing the structure of a cask for BWR.
Figure 14:
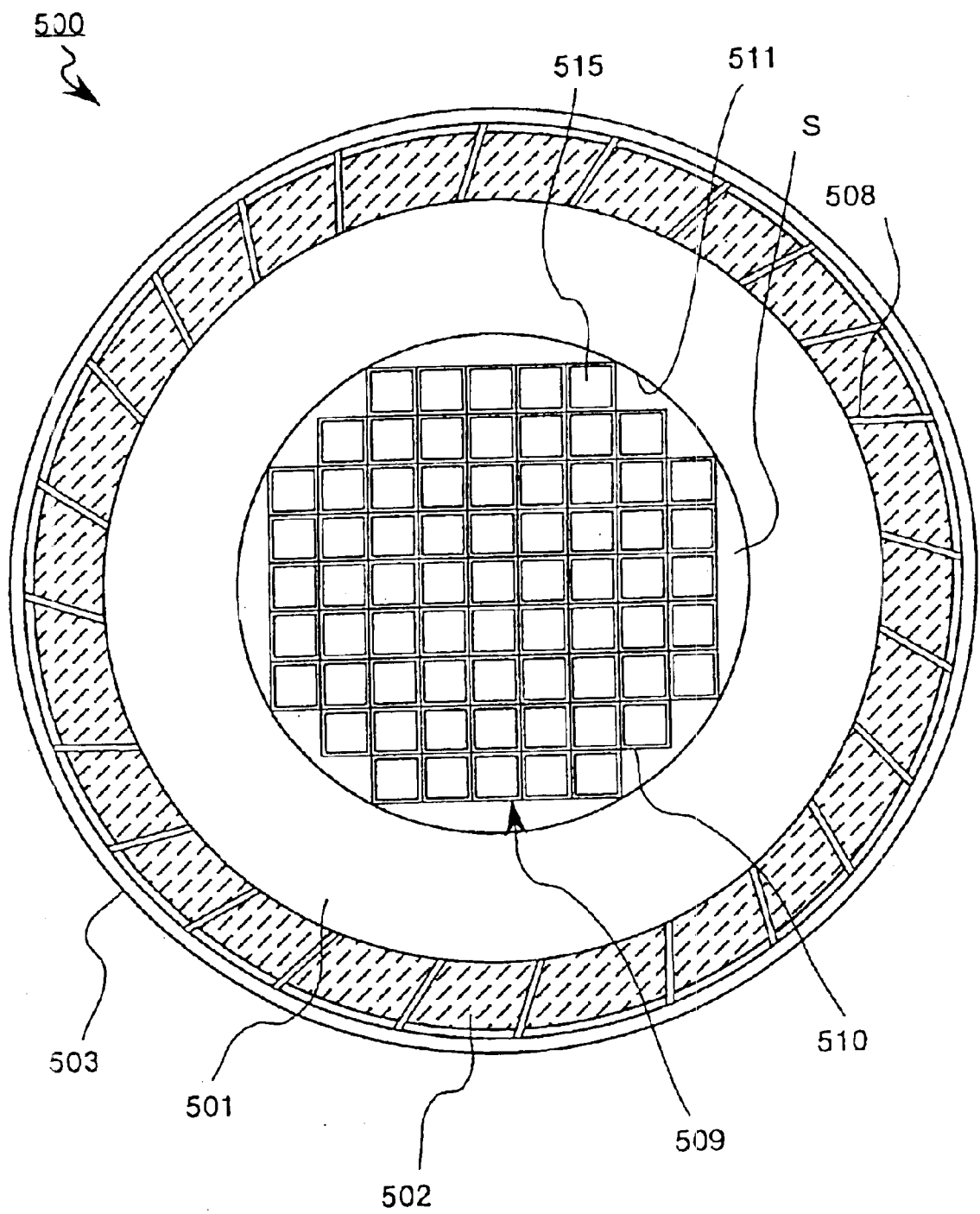
FIG. 14 is a radial direction sectional view which shows the structure of the cask shown in FIG. 13.
Figure 15:
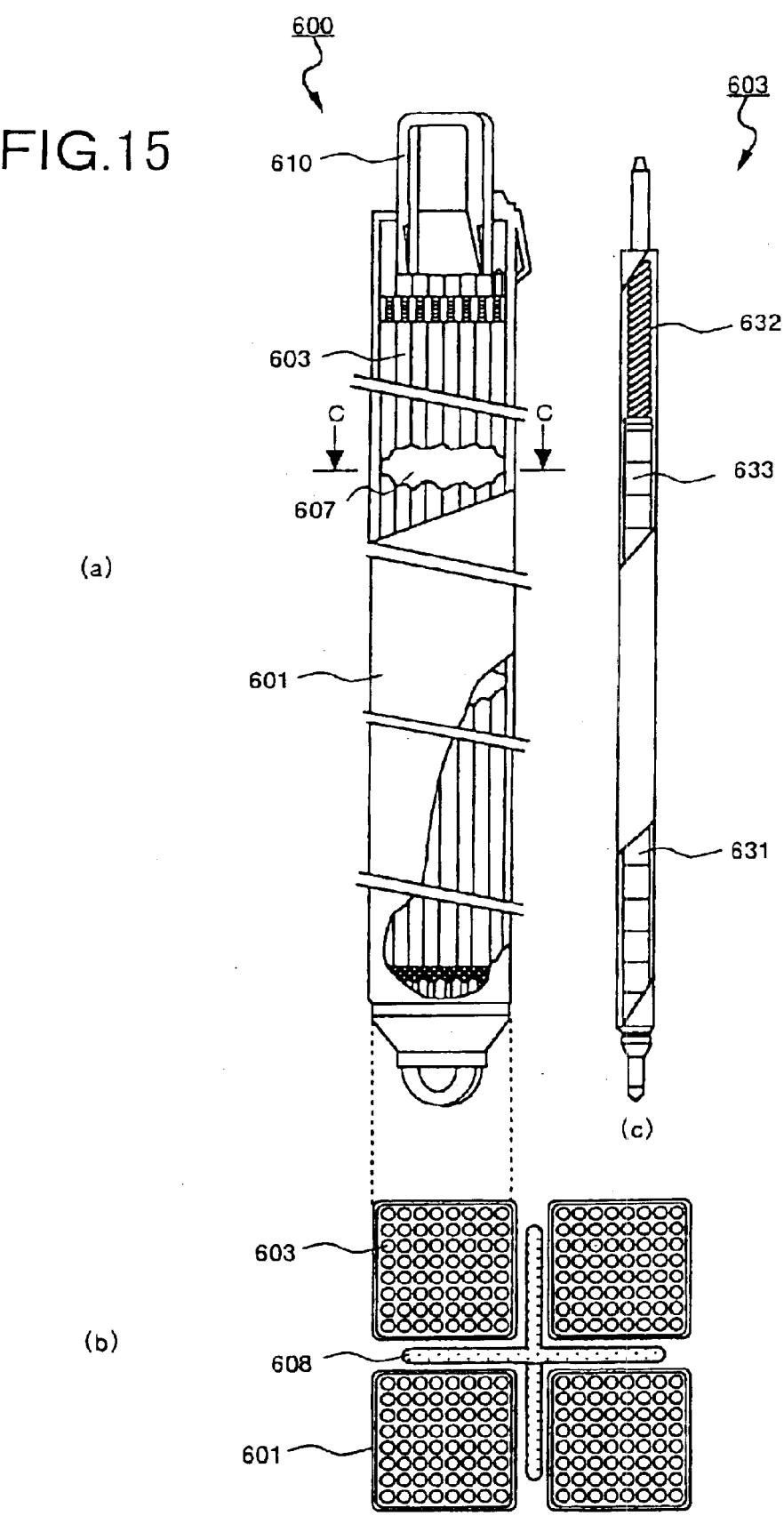
FIG. 15 is a diagram showing a structure of a fuel assembly for BWR.

FIG. 12 is a schematic diagram showing configuration when storing fuel assemblies 101 as spent fuel assemblies in a pool 102. As shown in FIG. 12, the fuel assembly 101 in which the absorbing rod 11 shown in the first embodiment is inserted is stored in a rack cell in a rack 104 arranged in the pool 102 filled with water 103. Herein, the fuels are stored in the pool 103 while mutually keeping a safe spacing distance d for assuring the subcriticality of the fuels, but sine the absorbing rods 11 having neutron absorbing capability are inserted in the fuel assemblies 101, the spacing distance d may shorter than the spacing distance d when the absorbing rods 11 are not inserted.

Therefore, according to the fourth embodiment, the fuel assemblies 101 can be arranged with a high density, and the number of fuel assemblies 101 to be stored is increased, or the size of the pool 102 can be reduced.

Figure 16:
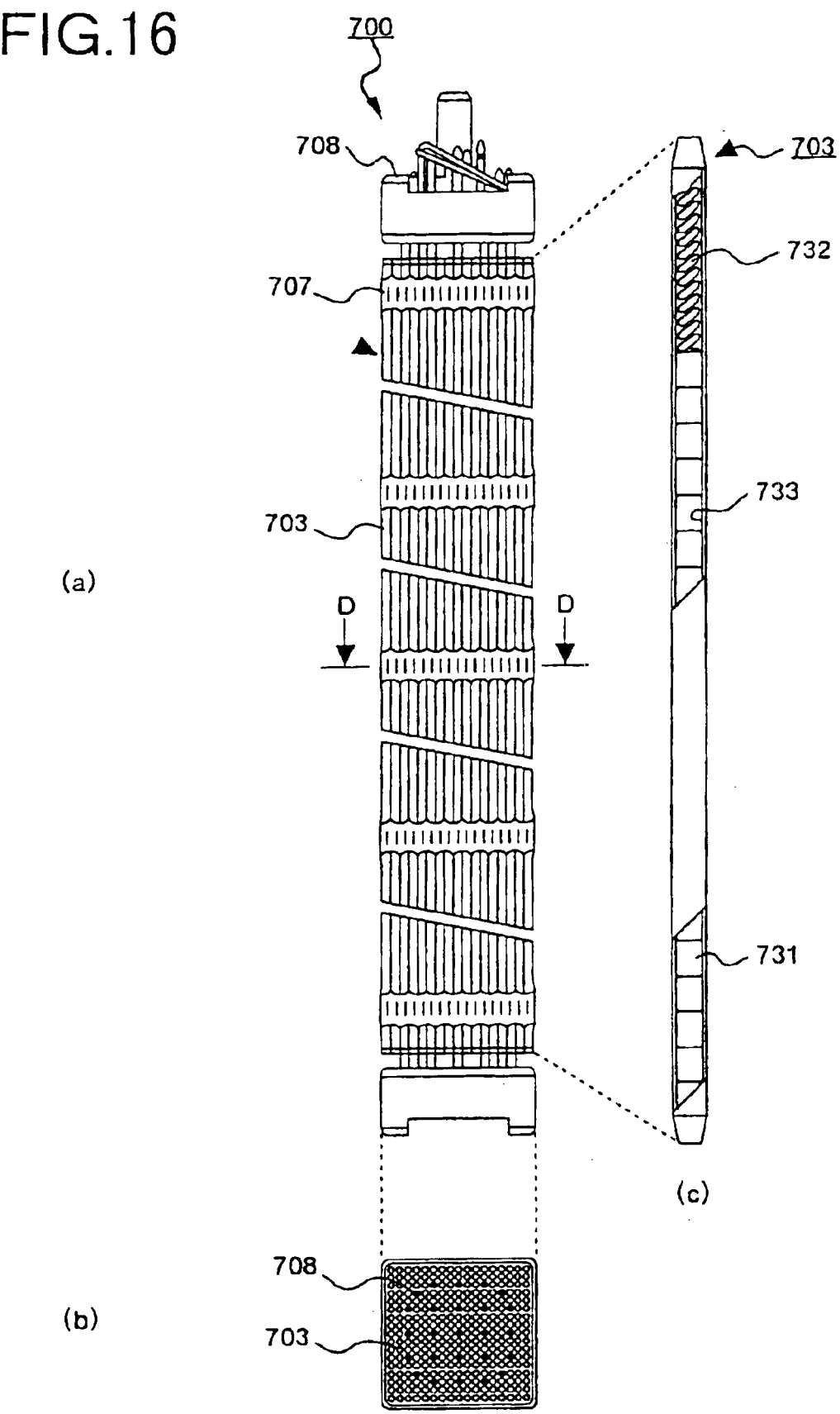
FIG. 16 is a diagram showing a structure of a fuel assembly for PWR.

In the first to fourth embodiments, spent fuel assemblies for PWR of 14×14 are shown as examples, but are not limited to this example, and it is evident such could be applicable similarly in other spent fuel assembles for PWR, such as a 17×17 or a 15×15 arrangement as shown in FIG. 16.

As described herein, according to the absorbing rod of one aspect of the present invention, using the absorbing rod having a nearly same shape as the shape of a columnar control rod for PWR used in reactivity control of core in a reactor, and having a neutron shielding capability, this absorbing rod is inserted into the control rod guide pipe of spent fuel assemblies or the control rod guide pipe including the measuring pipe, and therefore the neutrons can be shielded effectively in the spent fuel assemblies.

According to the absorbing rod of another aspect of the present invention, it is made of aluminum composite material or aluminum alloy formed by adding powder of boron or boron compound having a neutron absorbing performance to aluminum or aluminum alloy powder. Since the absorbing rod is made of such material, it does not become damaged by minor shocks during transportation. As a consequence, it is possible to maintain the neutron absorbing ability even during transport. For example, it is much safer and therefore preferable than an absorbing rod having a structure in which boron powder is filled inside a pipe.

According to the cask of still another aspect of the present invention, by inserting the absorbing rod group having a nearly same shape as the shape of a columnar control rod for PWR used in reactivity control of core in a reactor, and having a neutron shielding capability into the control rod guide pipe of spent fuel assemblies or the control rod guide pipe group including the measuring pipe, and putting the spent fuel assemblies into the cask, the number of neutrons radiated outside from the spent fuel assemblies can be decreased, so that the spacing distance among spent fuel assemblies can be shortened, and therefore it is effective to increase the number of spent fuel assemblies to be accommodated in the cavity of the shell main body having the neutron shield on the outer circumference and shielding the gamma-rays, or in the same number of containers as in the prior art, the cavity shape of the shell main body may be reduced or the thickness of the neutron shield on the outer circumference can be reduced, thereby reducing the overall size of the cask.

According to the cask of still another aspect of the present invention, when the control rods for PWR are recovered, the absorbing rod is used as the control rod for PWR, and the control rods are kept inserted in the spent fuel assemblies, and therefore the recovered control rods can be utilized effectively.

Further, since the equivalent thickness corresponding to the neutron absorbing capability or neutron moderating capability of the plates or square pipes for composing the basket for holding the spent fuel assemblies for PWR in the cask, of the portion corresponding to the sectional area of the absorbing rod inserted in the spent fuel assemblies for PWR, is reduced for the portion of the equivalent sectional area corresponding to the neutron absorbing capability or neutron moderating capability of the absorbing rod inserted in the spent fuel assemblies for PWR, thereby forming a basket shape, the water zones provided in the basket for PWR high in uranium enrichment factor, in particular, can be further reduced in height, or the basket may be formed even by eliminating the water zones, and therefore the shape of the basket for PWR high in uranium enrichment factor may be formed same as a simple shape of basket for BWR, and the efficiency of basket production can be enhanced.

Further, since the absorbing rod and basket are composed of an Al composite material or an Al alloy formed by adding powder of B or B compound having a neutron absorbing performance to Al or Al alloy powder, neutrons are absorbed in side and around the spent fuel assemblies, and therefore, aside from efficient neutron absorption in and around the spent fuel assemblies, since the absorbing rods are inserted in the fuel assemblies, the required performance in strength is lower, so that the weight reduction can be promoted.

According to the inserting apparatus of still another aspect of the present invention, the relative positions of the through-hole group of the guide member and the control rod guide pipe group of the spent fuel assemblies are adjusted on the basis of the result of detection by the position detection unit, and the absorbing rod block is lowered so that the through-hole group acts as a guide hole, and the long absorbing rod group can be inserted securely into the control rod guide pipe or the control rod guide pipe including the measuring pipe, and therefore the absorbing rods can be inserted into the control rod guide pipes and others easily and securely, so that the efficiency of inserting job can be enhanced.

Further, the distance detection unit detects when the distance between the suspender and the fixing member comes within a specific distance, and it is known that the absorbing rod group is securely inserted into the control rod guide pipe, so that dropping of absorbing rod group in the midst of insertion is prevented, and therefore the efficiency of inserting job can be enhanced, and the end of series of inserting job can be detected securely, so that the inserting job can be done safely.

According to the conveying and storing method of still another aspect of the present invention, at the inserting step, by inserting an absorbing rod group having a nearly same shape as the shape of a columnar control rod for PWR used in reactivity control of core in a reactor, and having a neutron shielding capability, into a control rod guide pipe group including a measuring pipe of spent fuel assemblies for PWR, and at the conveying and storing step, by conveying and storing the spent fuel assemblies for PWR in a state in which the absorbing rod group is inserted, the spacing distance between spent fuel assemblies can be shortened, and therefore the density of the spent fuel assemblies for PWR when conveying or storing the spent fuel assemblies for PWR can be enhanced, and efficient conveying or storing may be possible.

Further, when the control rods for PWR are recovered, the absorbing rod is used as the control rod for PWR, and the control rods are kept inserted in the spent fuel assemblies, and therefore the recovered control rods can be utilized effectively.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An absorbing rod configured to be insertable into one of a control rod guide pipe or a measuring pipe of spent fuel assemblies, said absorbing rod comprising a solid structure comprising one of an aluminum composite material and an aluminum alloy formed by adding one of a powder of boron or a boron compound having a neutron absorbing performance, to a powder of aluminum or of an aluminum alloy having an average diameter of 50–120 $\mu$m.

2. The absorbing rod according to claim 1, wherein said one of said aluminum composite material and said aluminum alloy comprises additional particles of a weight percentage in the range of 0.1–30, and wherein said powder of boron or said boron compound has a weight percentage in the range of 1–20, and has an average particle diameter of 0.01–100 $\mu$m.

* * * * *